United States Patent
Dongiovanni et al.

(10) Patent No.: US 9,534,080 B2
(45) Date of Patent: Jan. 3, 2017

(54) PROCESS FOR MANUFACTURING POLYETHYLENE TEREPHTHALATE

(71) Applicant: CLARIANT FINANCE (BVI) LIMITED, Tortola (VG)

(72) Inventors: Ernesto Dongiovanni, Horbourg-Wihr (FR); Korada Supat, Chonburi (TH)

(73) Assignee: CLARIANT INTERNATIONAL LTD., Muttenz (CH)

( * ) Notice: Subject to any disclaimer, the term of this patent is extended or adjusted under 35 U.S.C. 154(b) by 0 days.

(21) Appl. No.: 14/655,793

(22) PCT Filed: Nov. 30, 2013

(86) PCT No.: PCT/EP2013/003621
§ 371 (c)(1),
(2) Date: Jun. 26, 2015

(87) PCT Pub. No.: WO2014/101980
PCT Pub. Date: Jul. 3, 2014

(65) Prior Publication Data
US 2015/0329667 A1 Nov. 19, 2015

(30) Foreign Application Priority Data

Dec. 29, 2012 (EP) .................................. 12008668

(51) Int. Cl.
| | | |
|---|---|---|
| C08G 63/02 | (2006.01) | |
| C08G 63/86 | (2006.01) | |
| C08K 5/098 | (2006.01) | |
| C08K 5/5393 | (2006.01) | |
| C08G 63/183 | (2006.01) | |
| C08G 63/78 | (2006.01) | |
| C08G 63/85 | (2006.01) | |
| C08G 64/00 | (2006.01) | |

(52) U.S. Cl.
CPC ........... *C08G 63/866* (2013.01); *C08G 63/183* (2013.01); *C08G 63/78* (2013.01); *C08G 63/85* (2013.01); *C08K 5/098* (2013.01); *C08K 5/5393* (2013.01)

(58) Field of Classification Search
CPC .............................. C08G 63/19; C08G 63/605
USPC .................... 528/190, 193, 194, 271, 272
See application file for complete search history.

(56) References Cited

U.S. PATENT DOCUMENTS 5,874,517 A 2/1999 Huang et al.
8,859,713 B2 * 10/2014 Rao .................. C08G 63/82
528/272

FOREIGN PATENT DOCUMENTS

| JP | S 5351295 | 5/1978 |
| JP | S 5751815 | 3/1982 |
| JP | 0986847 | * 4/1997 |
| JP | H 09286847 | 11/1997 |
| WO | WO 2010/102795 | 9/2010 |

OTHER PUBLICATIONS

PCT International Search Report for PCT/EP2013/003621, mailed May 8, 2014.
International Preliminary Report on Patentability for PCT/EP2013/003621, mailed Jun. 30, 2015.
English Abstract for JPH 09286847, Nov. 4, 1997.
English Abstract for JPS 5351295, May 10, 1978.
English Abstract for JPS 5751815, Mar. 26, 1982.

* cited by examiner

*Primary Examiner* — Terressa Boykin
(74) *Attorney, Agent, or Firm* — Anthony A. Bisulca

(57) ABSTRACT

The invention relates to a process for producing a polyester resin, said process comprises the steps of
(i) providing a mixture of terephthalic acid, monoethylene glycol, a polycondensation catalyst which contains antimony, a phosphorous containing stabilizer comprising a compound of the formula (I)

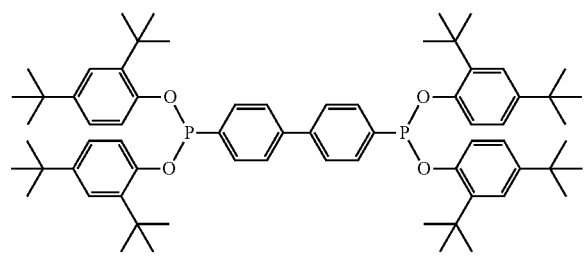

(I)

and optionally a colour correction additive containing cobalt ions;
(ii heating said mixture to a temperature of 220 to 270° C. to provide bis-hydroxyethylterephthalic acid ester; and
(iii) performing polycondensation of said bis-hydroxyethylterephthalic acid ester at a temperature of between 280 and 310° C. at reduced pressure.

15 Claims, No Drawings

PROCESS FOR MANUFACTURING POLYETHYLENE TEREPHTHALATE

This invention relates to an improvement in making polyethylene terephthalate (hereinafter "PET").

PET may be prepared, as is well known, by the ester interchange of dimethyl terephthalate with ethylene glycol or by the direct esterification of ethylene glycol and terephthalic acid, followed by condensation polymerization (hereinafter "polycondensation") in the presence of a catalyst such as antimony trioxide. The PET product may then be extruded and pelletized to produce polymer chip. The PET chip is then subjected to solid state polymerization in order to increase the polymer's intrinsic viscosity and to remove acetaldehyde produced in the pellets during manufacture. It is widely known in the art that the intrinsic viscosity of PET may be increased by solid state polymerization conducted in either air or an inert gas.

It is also widely known in the art that solid state polymerization may be used to eliminate acetaldehyde contained in the polyester chip as disclosed in U.S. Pat. No. 5,874,517.

The ester interchange of dimethylterephtahlate and ethylene glycol is a disadvantageous method from the standpoint of conducting the process because of the necessity to recycle methanol set free by the transesterification reaction.

It is an object of the present invention to provide a process for manufacturing polyethylene terephthalate, which more specifically is useful for making beverage bottles, in a simple and economic way which in particular reduces the polycondensation time (hereinafter "PC time") to arrive at the desired bottle-grade PET.

It was found that this object is fulfilled by a process comprising a direct esterification of terephthalic acid (hereinafter "PTA") and monoethylene glycol (hereinafter "MEG") and an addition of selected additives at a specific time of the process.

According to the present invention, there is provided a process for producing a polyester resin, said process comprises the steps of
(i) providing a mixture of terephthalic acid, monoethylene glycol, a polycondensation catalyst which contains antimony, a phosphorous containing stabilizer comprising a compound of the formula (I)

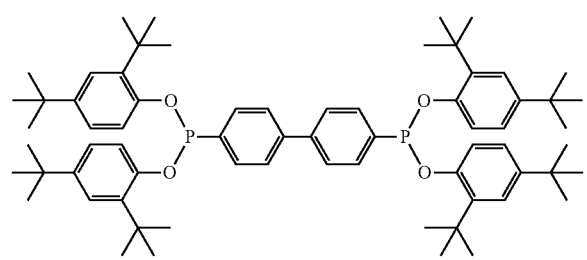

(I)

and optionally a colour correction additive containing cobalt ions;
(ii) heating said mixture to a temperature of 220 to 270° C. to provide bis-hydroxyethylterephthalic acid ester (hereinafter "BHET");
(iii) performing polycondensation of said bis-hydroxyethylterephthalic acid ester at a temperature of between 280 and 310° C. at reduced pressure.

As to step (i):
The terms "polyethylene terephthalate" and "PET" as used herein are used generally to include high-molecular weight polymers made by condensing ethylene glycol with dimethyl terephthalate or terephthalic acid no matter how prepared. Furthermore, these terms are meant to include well-known polyethylene terephthalate polymers which are modified by the inclusion of minor amounts, e.g., less than about 20 percent by weight of the polymer, of comonomers or modifying agents, as is otherwise well known. Such comonomers or modifying agents include aromatic and aliphatic diols and polyols; aromatic and aliphatic carboxylic acids; or single molecules containing both carboxylic and alcohol functionality. Examples of diols include 1,4-butanediol, cyclohexanedimethanol, diethylene glycol and/or 1,3-propanediol. Examples of carboxylic diacids include isophthalic acid, adipic acid, 2,6-naphthalene dicarboxylic acid and p-hydroxy benzoic acid. Minor amounts of chain branching agents and/or chain terminating agents may also be used. Such chain branching agents include, for example, polyfunctional acids and/or polyfunctional alcohols such as trimethylol propane and pentaerythritol. Chain terminating agents include monofunctional alcohols and/or monofunctional carboxylic acids such as stearic acid and benzoic acid. Mixtures of the chain branching and chain terminating agents may also be used. Although the terms polyethylene terephthalate and PET are meant to include polyethylene terephthalate polymers containing minor amounts of modifying agents or chain branching agents, for purposes of illustration only, the remainder of this specification is generally directed to PET which does not contain such added modifying agents or chain branching agents.

The molar ratio of PTA and MEG is such that a polycondensation can occur, i.e. preferably in about equimolar amounts, preferably in an amount of between 1:1 and 1:1.4, more preferably between 1:1.1 and 1:1.3, most preferably between 1:1.1 and 1:1.25, PTA:MEG.

The amount polycondensation catalyst which contains antimony is expediently between 150 and 450 ppm, preferably between 200 and 400 ppm, more preferably between 200 and 300 ppm, most preferably between 225 and 275 ppm, by weight, calculated on Sb, of the reaction mixture.

The polycondensation catalyst which contains antimony is preferably selected from the group consisting of antimony trioxide, antimony oxalate, antimony glucoxide, antimony butoxide, antimony dibutoxide, most preferred is antimony trioxide.

The amount of the phosphorous containing stabilizer comprising a compound of the formula (I) is such that the amount of P is expediently between 1 and 20 ppm, preferably between 2 and 15 ppm, more preferably between 3 and 10 ppm, most preferably between 4 and 7.5 ppm, by weight of the reaction mixture.

Said phosphorous containing stabilizer comprising a compound of the formula (I) is expediently a reaction product of phosphorous trichloride with 1,1'-biphenyl and 2,4-bis(1,1-dimethylethyl)phenol, commercially available from Clariant under the name of ®Hostanox P-EPQ, CAS 38613-77-3.

The amount of the colour correction additive containing cobalt ions is expediently between 0 and 100 ppm, preferably 0 and 50 ppm, more preferably 5 to 50 ppm, most preferably 10 to 30 ppm, by weight of the reaction mixture. Said color correction additive containing cobalt ions is preferably a cobalt(II) acetate or a hydrate thereof.

As to step (ii):
The condensation reaction to provide BHET as an intermediary product is preferably carried out at a temperature of between 240 and 270° C., more preferably between 250 and 265° C. The condensation reaction is expediently carried out at elevated pressure, preferably at 1.2 to 10 bar, more preferably at 2 to 5 bar. The water formed during the condensation is preferably removed from the reaction mixture.

As to step (iii):

The polycondensation reaction is preferably carried out at a temperature of between 280 and 300° C., more preferably between 285 and 295° C., at a reduced pressure of below 100 mbar, preferably below 20 mbar, more preferably below 10 mbar, expediently while removing polycondensation water. As a lower limit, 0.5 to 1 mbar is sufficient.

The polycondensation reaction is performed for a time until a polyester of the desired intrinsic viscosity is obtained. The intrinsic viscosity of the PET is generally from about 0.40 to about 1.0, preferably from about 0.50 to 0.85, more preferably from about 0.55 to about 0.80, most preferably from about 0.55 to about 0.70, deciliters per gram, based on calculations made from measurements in o-chlorophenol at 25° C. The specific preferred range of intrinsic viscosity depends on end use. The measurement of the intrinsic viscosity is carried out according to DIN 53728.

The PET reaction product may then be extruded at an elevated temperature into water and allowed to solidify therein. The solid PET may then be pelletized by means known to those skilled in this art. For example, the PET may be pelletized using an underwater pelletizer.

The PET useful in the present invention may be in any form such as pellets, chips, or granules, preferably of relatively uniform size and shape. For ease of reference, the PET will hereinafter be referred to as PET chip but it is understood that the present invention is applicable to PET in any form and the term PET chip is meant to include PET in any form.

In an alternative embodiment, PET may be produced using a continuous process in which the PET reaction product is directly extruded into final form, rather than chip. Such direct extrusion is known in the art for use in producing film, fiber, and other articles.

The presence of all ingredients specified in step (i) before starting step (ii) is critical to obtain the desired shorter polycondensation times. Shorter PC times allows for increased polymer throughput, thereby producing a PET resin which is significantly more economically attractive.

EXAMPLE 1

The polymerization is carried out in a standard semi-technical production unit for two stage polymerization of terephthalic acid (PTA) and monotheylen glycol (MEG), capable of producing about 5 kg of PET chip.

PTA and MEG are charged in a molar ration of 1:1,2 PTA:MEG. All other starting materials are added prior to the process, which are the catalyst ($Sb_2O_3$: dosed to have 250 ppm Sb in the reaction mixture), the color correction additive (Co(II)acetate: dosed to have 25 ppm Co in the reaction mixture) and the phosphorous containing stabilizer Hostanox P-EPQ: dosed to have 5 ppm P in the reaction mixture.

In the first reaction step (ii) the direct esterification is carried out at 260° C. at a pressure of 3.76 bar to form the intermediate bis-hydroxyethylterephthalic acid ester (BHET). In the second reaction step (iii) the polycondensation of the BHET is done at 290° C. under removal of water at a pressure of 2 mbar to come to a PET polyester with an intrinsic viscosity of 0.6 dl/g. The measurement of the intrinsic viscosity is carried out according to DIN 53728.

EXAMPLE 2 (COMPARATIVE)

The polymerisation is carried out as described in Example 1, except that Hostanox
P-EPQ dosed to have 5 ppm P in the reaction mixture is replaced by CEPA (=2-carboxyethyl phosphonic acid) dosed to have 5 ppm P in the reaction mixture.

EXAMPLE 3 (COMPARATIVE)

The polymerisation is carried out as described in Example 1, except that the antimony trioxide polycondensation catalyst is absent in the starting reaction mixture and is added after finalizing step (ii).

| Example | Hostanox P-EPQ [ppm phosphorous] | CEPA [ppm phosphorous] | $Sb_2O_3$ added | PC time [min] |
|---|---|---|---|---|
| 1 | 5 ppm | 0 | in step (i) | 87 |
| 2 (Comp.) | 0 | 5 ppm | in step (i) | 100 |
| 3 (Comp.) | 5 ppm | 0 | after step (ii) | 110 |

The invention claimed is:

1. A process for producing a polyester resin comprising the steps of
   (i) providing a mixture of terephthalic acid, monoethylene glycol, a polycondensation catalyst which contains antimony, a phosphorous containing stabilizer comprising a compound of the formula (I)

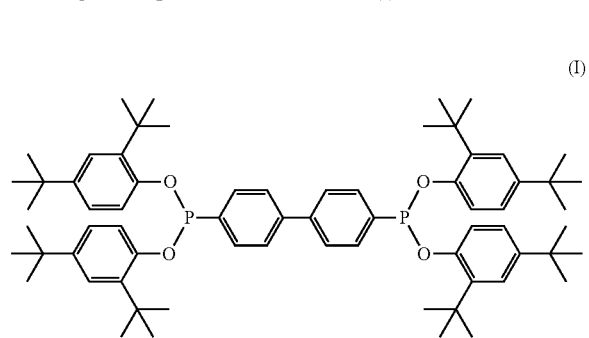 [SMILES: CC(C)(C)c1ccc(OP(Oc2ccc(C(C)(C)C)cc2C(C)(C)C)c2ccc(-c3ccc(P(Oc4ccc(C(C)(C)C)cc4C(C)(C)C)Oc4ccc(C(C)(C)C)cc4C(C)(C)C)cc3)cc2)c(C(C)(C)C)c1]

(I)

and optionally a colour correction additive containing cobalt ions;
   (ii) heating the mixture to a temperature of 220 to 270° C. to provide bis-hydroxyethylterephthalic acid ester; and
   (iii) performing polycondensation of the bis-hydroxyethylterephthalic acid ester at a temperature of between 280 and 310° C. at reduced pressure.

2. The process as claimed in claim 1, wherein the molar ratio of terephthalic acid and monoethylene glycol is between 1:1 and 1:1.4 terephthalic acid: monoethylene glycol.

3. The process as claimed in claim 1, wherein the molar ratio of terephthalic acid and monoethylene glycol is between 1:1.1 and 1:1.25 terephthalic acid: monoethylene glycol.

4. The process as claimed in claim 1, wherein the amount of the polycondensation catalyst which contains antimony is between 150 and 450 ppm by weight, calculated on Sb, of the mixture of step (i).

5. The process as claimed in claim 1, wherein the amount of the polycondensation catalyst which contains antimony is between 225 and 275 ppm by weight, calculated on Sb, of the mixture of step (i).

6. The process as claimed in claim 1, wherein the polycondensation catalyst which contains antimony is selected from the group consisting of antimony trioxide, antimony oxalate, antimony glucoxide, antimony butoxide and antimony dibutoxide.

7. The process as claimed in claim 1, wherein the polycondensation catalyst which contains antimony is antimony trioxide.

8. The process as claimed in claim 1, wherein the amount of the phosphorous containing stabilizer comprising a compound of the formula (I) is such that the amount of phosphorus is between 1 and 20 ppm by weight of the mixture of step (i).

9. The process as claimed in claim 1, wherein the amount of the phosphorous containing stabilizer comprising a compound of the formula (I) is such that the amount of phosphorus is between 4 and 7.5 ppm by weight of the mixture of step (i).

10. The process as claimed in claim 1, wherein the amount of the colour correction additive containing cobalt ions is between 0 and 100 ppm by weight of the mixture of step (i).

11. The process as claimed in claim 1, wherein the color correction additive containing cobalt ions is cobalt (II) acetate or a hydrate thereof.

12. The process as claimed in claim 1, wherein step (ii) is carried out at a temperature between 250 and 265 ° C.

13. The process as claimed in claim 1, wherein step (ii) is carried out at a pressure of between 1.2 to 10 bar.

14. The process as claimed in claim 1, wherein step (iii) is carried out at a temperature between 285 and 295° C.

15. The process as claimed in claim 1, wherein step (iii) is carried out at a pressure of below 100 mbar.

* * * * *